(12) United States Patent
Sellan

(10) Patent No.: US 7,648,551 B2
(45) Date of Patent: Jan. 19, 2010

(54) METHOD FOR PRE-HEATING, TRANSFORMING AND MELTING A METAL CHARGE AND RELATIVE PLANT

(75) Inventor: Romano Sellan, Trieste (IT)

(73) Assignee: Danieli & C. Officine Meccaniche SpA, Buttrio (IT)

( * ) Notice: Subject to any disclaimer, the term of this patent is extended or adjusted under 35 U.S.C. 154(b) by 306 days.

(21) Appl. No.: 10/580,550

(22) PCT Filed: Nov. 25, 2004

(86) PCT No.: PCT/IB2004/003873

§ 371 (c)(1),
(2), (4) Date: May 26, 2006

(87) PCT Pub. No.: WO2005/052196

PCT Pub. Date: Jun. 9, 2005

(65) Prior Publication Data

US 2007/0101821 A1  May 10, 2007

(30) Foreign Application Priority Data

Nov. 27, 2003  (IT)  ............ UD2003A0231

(51) Int. Cl.
*C21B 13/12* (2006.01)
*C21C 5/52* (2006.01)
*C22B 4/00* (2006.01)

(52) U.S. Cl. ............ 75/10.62; 75/382; 75/387; 75/584; 266/901; 266/44

(58) Field of Classification Search ............ 75/10.62, 75/382, 387, 584; 373/104, 79, 80; 266/901
See application file for complete search history.

(56) References Cited

U.S. PATENT DOCUMENTS 3,772,000 A * 11/1973 Hyde et al. .......... 75/529
3,789,126 A    1/1974 Brusa (Continued)

FOREIGN PATENT DOCUMENTS

EP    0592723    4/1994

(Continued)

OTHER PUBLICATIONS

Machine Translation of JP 08-005248.*

(Continued)

*Primary Examiner*—George Wyszomierski
*Assistant Examiner*—Tima M McGuthry-Banks
(74) *Attorney, Agent, or Firm*—Novak Druce + Quigg LLP

(57) ABSTRACT

Method and plant for pre-heating, transforming and melting a metal charge comprising metal scrap, in an electric arc furnace associated with a tunnel to transport, pre-heat and discharge the scrap. The furnace comprises a hearth and a roof through which the electrodes pass. The method provides that the furnace is weighed at least periodically in order to detect the quantity of discharged scrap present inside the furnace itself, that the temperature of the liquid bath inside the furnace is detected at least periodically and that at least the discharge delivery of the scrap inside the furnace is detected by weighing and is regulated in order to maintain the temperature of the liquid bath around a pre-determined value.

20 Claims, 1 Drawing Sheet

U.S. PATENT DOCUMENTS

| | | | |
|---|---|---|---|
| 3,813,209 A | 5/1974 | Venetta | |
| 3,985,497 A | 10/1976 | Fellnor et al. | |
| 4,002,465 A | 1/1977 | Brusa | |
| 4,010,026 A * | 3/1977 | Engledow | 75/10.58 |
| 4,083,675 A | 4/1978 | Fellnor et al. | |
| 4,543,124 A | 9/1985 | Vallomy | |
| 4,564,388 A * | 1/1986 | Vallomy | 75/10.12 |
| 4,679,773 A * | 7/1987 | Wunsche | 266/45 |
| 4,797,154 A | 1/1989 | Benedetti et al. | |
| 4,898,227 A | 2/1990 | Benedetti et al. | |
| 5,099,438 A * | 3/1992 | Gulden et al. | 700/274 |
| 5,400,358 A | 3/1995 | Vallomy | |
| 6,004,504 A * | 12/1999 | Vallomy | 266/79 |
| 6,155,333 A | 12/2000 | Vallomy | |

FOREIGN PATENT DOCUMENTS

| | | |
|---|---|---|
| FR | 2838508 | 10/2003 |
| JP | 08005248 | 1/1996 |
| RU | 2082763 | 6/1997 |
| RU | 2128407 | 3/1999 |

OTHER PUBLICATIONS

Machine translation of JP 08-005248, published Jan. 12, 1996.*
English Translation of JP 08-005248A published Jan. 12, 1996.*
European Patent Office Listing for IT949145 published Jun. 11, 1973.
European Patent Office Listing for IT1009463 published Dec. 10, 1976.
European Patent Office Listing for IT1201815 published Feb. 2, 1989.

* cited by examiner

METHOD FOR PRE-HEATING, TRANSFORMING AND MELTING A METAL CHARGE AND RELATIVE PLANT

This application is a §371 National Stage Application of International Application No. PCT/IB2004/003873, filed on 25 Nov. 2004, claiming the priority of Italian Patent Application No. UD2003A000231 filed on 27 Nov. 2003.

FIELD OF THE INVENTION

The present invention concerns a method and a relative plant for pre-heating, transforming and melting a metal charge.

BACKGROUND OF THE INVENTION

Plants for transforming and melting metal charges, of the pre-reduced type or not, are known, which comprise an electric arc furnace suitable to collaborate with a tunnel to transport and pre-heat the scrap. The electric furnace provides at least a container, or hearth, and a covering roof. The electrodes are introduced into the roof through suitable holes.

The transport and pre-heating tunnel cooperates with the electric furnace on one side and, on the other side, both with a scrap loading system and also with a gas removal system. The gases, as disclosed by IT-B-949.145 (dated 1973), are drawn in hot from inside the electric arc furnace and run through the whole tunnel in counter-flow to the scrap. The same document also teaches to provide a hearth that oscillates by means of jacks, in order to provide on each occasion the discharge of the slag or the tapping of the molten metal.

It is also known, for example from IT-B-1009463 (dated 1974), to provide systems that continuously feed the pre-heated metal charge inside the furnace. This document also discloses that the pre-heating of the metal charge occurs inside a cylinder made of refractory material rotating around an axis that is inclined with respect to the horizontal. In this way, the metal charge continually changes its position inside the cylinder so that, by means of the convective motions of the gases emerging from the furnace, a uniform heating of the metal charge is obtained before it is introduced into the furnace.

Document U.S. Pat. No. 3,985,497 (dated 1974) teaches to burn the non-combusted gases deriving from the process of pre-heating the metal charge in order to reduce the polluting emissions into the environment.

Other systems for pre-heating scrap in a tunnel before it is sent to the furnace are shown in U.S. Pat. No. 3,813,209 (dated 1973) and U.S. Pat. No. 4,083,675 (dated 1978).

The document Stahl und Eisen 95 (January 1975) describes a method in which the exhaust gases of an electric arc furnace are conveyed in counter-flow through a pre-heating tunnel where the scrap to be continuously loaded into the furnace is transported. This document also provides that inside the furnace, after tapping, a head of liquid metal is maintained of between 4 and 6 tonnes, in order to guarantee a trouble-free start-up of the subsequent melting.

Document IT-B-1201815 (dated 1986) not only provides a continuous feed of the charge into a furnace through a pre-heating plant, but also provides to blow into the bath carburetion means, de-sulphurizing mixtures, de-oxidants and mixtures for the foamy slag. Apart from this, IT'815 also teaches to provide a ladle handler which picks up the ladle filled with molten steel in the tapping station, in order to feed it directly to the casting zone, so as to function as a connecting element between the melting zone and the continuous casting zone of the molten steel. It also provides an intermediate station for heating the ladles in order to keep the temperature of the molten steel at values suitable for casting.

The patents U.S. Pat. Nos. 4,543,124 and 4,564,388 respectively describe a device and a method for transforming and continuously melting metal. They are substantially characterized in that in all the steps of loading, melting and refining, the electric feed to the furnace is maintained at maximum power, irrespective of the steps in the cycle and the technological characteristics of the material being worked.

It also provides that loading with the material that functions as the charge is also continued during the tapping of the molten metal. It further provides that the tapping of the molten metal is about 50% of the total volume of the molten metal, and that it occurs by inclining the furnace at most up to 15°, without removing the electrodes and keeping the electric power to the electrodes at maximum power.

The patent US-B2-6,155,333 substantially returns to the teaching of IT'815 in achieving an integrated plant with a direct connection between the melting zone and the casting zone by using an intermediate metallurgical container.

The documents described above are indicated only as examples, since the literature on this subject is extremely extensive. However, those operating in this field are well-known for their continuous effort to optimize the various technical and technological aspects of the entire process to transform iron material into molten steel to be sent, for example, for continuous casting. The purposes of this continuous research are to guarantee, at the same time:
optimum quality characteristics of the molten material,
reduced wear and risk of damage to parts and components, and hence reduced need for maintenance and replacement, particularly of the coverings and/or refractory material,
reduced energy consumption for the same amount of molten metal,
reduced cycle times,
lower incidence of the cost of manpower.

In view of this, and based on long and thorough studies and experiments, Applicant has made significant improvements to existing technologies, including those described in the documents mentioned above, has overcome some disadvantages of the state of the art and embodied the present invention.

SUMMARY OF THE INVENTION

The present invention is set forth and characterized essentially in the main claims, while the dependent claims describe other innovative characteristics of the invention.

The invention concerns a method and a relative plant for pre-heating, transforming and melting a metal charge. The plant according to the invention comprises an electric arc furnace associated with a tunnel that transports and pre-heats the metal charge to be introduced inside the furnace.

The electric furnace comprises a containing hearth which can be made to oscillate by means of jacks, by an angle of between ±4° during normal functioning, for example during the steps of loading, melting and refining the liquid metal.

Moreover, it can be made to oscillate by a greater angle, comprised between −15° and +25°, respectively during the steps of discharging the slag (slagging) and tapping the liquid metal.

For example, during the step of discharging the slag (slagging), the hearth can incline by as much as −15°, while during the tapping step it inclines the opposite way by up to +25°.

According to a characteristic of the present invention, the tapping step provides to keep inside the hearth a quantity of molten metal equal to about 30-40% of the overall capacity of molten metal of the hearth. This quantity has been identified by Applicant as the optimum compromise between the need to guarantee a rapid start-up of the subsequent melting, without a break and without risks deriving for example from sudden falls of the scrap onto the bottom of the hearth, and the normal working productivity of the furnace.

For example, in the case of a hearth suitable for a head of molten metal of 80 tonnes, the quantity removed in the tapping step is about 55 tonnes while a base of about 25 tonnes of molten metal is left inside the furnace.

According to the invention, just before starting to make the furnace oscillate, during the tapping step the method provides that the electrodes are raised from the bath so that they do not come into contact with said bath in any situation; at the moment the electrodes begin to be removed from the liquid bath, the feed of electric energy is disconnected.

Moreover, in the event that the loading of the material occurs discontinuously by means of baskets with pre-heated scrap, the invention provides that the roof of the furnace is opened and the electric energy to the electrodes interrupted, that the basket is emptied inside the furnace, that the roof is repositioned and that the electric feed is restored to the electrodes.

In the event that loading occurs by means of a pre-heating tunnel directly connected with the furnace, the invention provides that said loading can take place in a specific step that follows the tapping of the molten metal and can continue partly during the melting cycle. However, the loading is interrupted both during the final refining stage of the metal which precedes tapping, and also during the tapping step. Applicant has in fact verified that loading scrap during refining determines a deterioration in the quality of the molten metal and in any case lengthens the times required, thus canceling the benefits deriving from the early introduction of the scrap.

Moreover, when loading occurs with the furnace in its inclined condition, for example in the tapping step, the insertion of the scrap can cause knocks and damage to the walls of the furnace, with removal of refractory material and possible breakage of the cooling panels.

According to the invention, between the end of the tapping operation and the start of loading of the scrap for the subsequent cycle, the electric feed to the electrodes is interrupted and the following operations are carried out:

a) the furnace is rotated from the tapping position to the slagging position in order to interrupt the flow of liquid steel;
b) the cleaning of the tapping hole is controlled;
c) the tapping channel is filled by granular material with a high melting point;
d) the furnace is returned to the horizontal position and the vertical blocks (mechanical abutments that limit the rotation to reduced values during normal functioning) are inserted;
e) only at this point are the electrodes enabled to descend (and hence to deliver electric power).

The presence of the vertical blocks allows to limit the oscillation of the electric arc furnace in order to prevent the interference of the hearth with the last (retractable) segment of the scrap conveyor which enters inside said furnace.

Then, when the electrodes are inserted in the roof and the furnace has been stabilized in its position of normal functioning, the scrap loading is started and electric energy is progressively supplied until the desired value is reached.

According to the invention, before proceeding with raising the electrodes in order to start tapping, the electric power fed to the furnace is reduced with respect to its normal working value, by means of a reduction step.

According to the invention, the electric power is fed to the furnace according to the quantity of scrap present inside the furnace. In other words, the power fed is not always and in any case the maximum power available for the plant, but is on each occasion regulated according to the actual quantity of scrap in that specific melting cycle and/or according to the detected temperature of the bath of liquid metal.

This stratagem entails a first obvious advantage in terms of energy consumption, since the power delivered is always the optimum power for that specific quantity. Moreover, the quality of material obtained is also improved since the power delivered for melting and refining is set according to the actual quantity of scrap.

For measuring the quantity of scrap, the invention provides that the whole "furnace system" is continuously weighed, removing the tare, known in advance, in order to find how much scrap is present inside.

According to another characteristic of the invention, an at least periodic control is carried out of the temperature of the molten metal. To be more exact, according to a first feature of the invention, the value of the temperature of the molten metal is used to regulate the melting profile and the loading of scrap inside the furnace, so as to keep said temperature always around a pre-set value.

According to another feature, as said above, the temperature value is used as another parameter, apart from the weight of the scrap inside the furnace, in order to regulate the electric power delivered and more particularly maximizing the power according to the charge and the stability signal of the arc, detected for example by means of a harmonic analyzer. This means that the power fed to the electrodes will oscillate constantly from the maximum value, which the system can deliver to the electrodes, to a lower value according both to the quantity of scrap which on each occasion remains to be melted and also to the temperature of the metal already melted.

According to the invention, the tuyères that introduce the oxygen, carbon, carburetion means, de-sulphurizing mixtures, de-oxidants and mixtures for the foamy slag, and also the oxygen lances, are arranged in a position such as to remain as far as possible below the level of the liquid metal. To be more exact, in the furnace according to the invention there are specific tuyères for the introduction of carbon and specific tuyères for the introduction of oxygen.

Transport gas is made to pass through the tuyères for the introduction of carbon during the tapping step and the transitory steps, while the tuyères for the introduction of oxygen are kept active during said steps too, with a minimum quantity of oxygen; in both cases, this is in order to prevent the oxygen outlet holes from becoming blocked.

According to another feature of the present invention, the characteristics of the gases as they exit from the transport and pre-heating tunnel are controlled in order to verify that no combustible gases are present.

In order to ensure that all said combustible gases as emerging from the electric furnace and channeled into the scrap pre-heating tunnel are burnt, the method according to the invention provides, at the beginning of the tunnel, that is to say, near the electric furnace, a burner that has the sole purpose of igniting, under every operating condition, the combustible gases that emerge from the electric furnace so that they burn naturally.

Moreover, the method provides to always have some residual oxygen (>6-8%), possibly fed by means of air injectors, sufficient to guarantee, under every operating condition, that unburnt and potentially explosive gases are absent.

The gases removed at the beginning of the tunnel, that is to say, in the part where the scrap is loaded, enter at a speed of about 20 m/s and at a temperature of about 800° C. into a sedimentation chamber in order to deposit the particulate; the sedimentation chamber is thermally insulated. From the sedimentation chamber, through a non-insulated pipe, the gases enter a cooling tower.

The invention provides that said gases are cooled quickly in the cooling tower to a controlled temperature of at least 250° C., or better lower, with a cooling speed of not less than 250° C./sec, advantageously 400° C./sec.

The device provided for this quick cooling consists of a system to inject water, mixtures of water and air, or also mixtures of water and powders in an appropriate and controlled quantity. Said injection means are made, constructed and managed in such a manner as to produce a nebulized flow characterized by a fine dispersion of the water droplets so as to be able to vary as desired its speed, diameter and the opening angle of the cone.

Thanks to this treatment, the abatement of the polluting emissions of dioxins and furans is guaranteed, thoroughly and in line with the strictest international directives in this field.

BRIEF DESCRIPTION OF THE DRAWINGS

These and other characteristics of the present invention will become apparent from the following description of a preferential form of embodiment, given as a non-restrictive example, with reference to the attached FIG. 1 which is a schematic illustration of a plant to pre-heat, transform and melt a metal charge.

DETAILED DESCRIPTION OF A PREFERENTIAL FORM OF EMBODIMENT OF THE INVENTION

Figure 1:
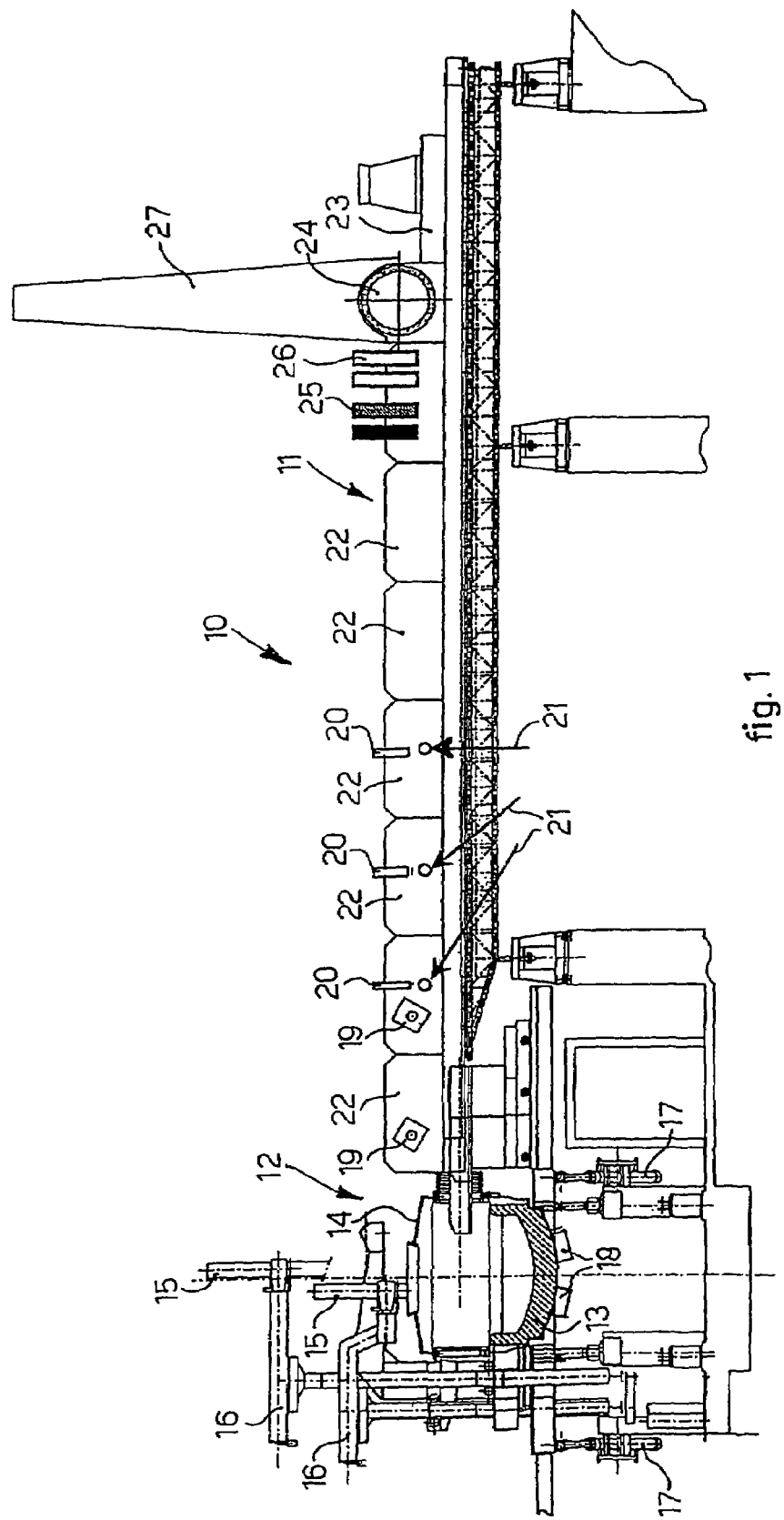

With reference to the attached FIGURE, a plant to pre-heat, transform and melt a metal charge is denoted in its entirety by the reference number 10 and comprises, as essential elements, a tunnel 11 to transport and pre-heat the scrap and an electric arc furnace 12.

The electric furnace 12 comprises a hearth 13 to contain the scrap and a covering roof 14. The roof 14 has holes through which the electrodes 15 are introduced, which are supported by and mounted on relative arms 16. The electrodes 15 are connected in a known manner to a feed transformer and can be fed irrespectively with direct current (DC) or alternating current (AC). The hearth 13 is supported by jacks 17 which allow it to oscillate according to the methods coherent with the various stages of the cycle, particularly a reduced oscillation, ±4° during the cycle to introduce and melt the scrap, and a greater oscillation, between −15° and +25° during the slagging and tapping steps.

The shape of the hearth, in relation to the inclination that it assumes in the step of tapping the liquid metal, is such as to keep a liquid pool of about 30-40% of its capacity.

The furnace 12, in known manner, is equipped with burners, oxygen lances and injectors of carbon powders and lime, able to promote the foaming of the slag, but these are not shown here.

To be more exact, the injection tuyères are arranged so as to have the outlet mouths arranged below the level of the slag.

The furnace system is also mounted on load cells 18 suitable to provide the information concerning the weight bearing on them, with the methods and for the purposes which will be clarified hereafter. Inside the furnace temperature probes are provided in order to measure the temperature of the liquid bath for the purposes indicated hereafter.

The metal charge which is used consists of at least 80% iron, which can be sponge iron arriving from a process of direct reduction, or pellets, briquettes, or scrap in general.

Apart from using the conveyor system associated with the tunnel 11, the furnace can be loaded by means of a basket system, particularly in the case of a cold start-up or after interruptions in the functioning thereof.

According to the invention, loading by means of the tunnel is activated after a quantity of metal has been melted at least equal to the normal quantity that forms the liquid pool and that is kept inside the hearth. Another condition for starting loading by means of the tunnel, according to the invention, is that the temperature of the molten metal is at least about 1500° C.

According to the invention, the speed at which the scrap or other material that makes up the charge is introduced is regulated so as to keep in any case the temperature of the bath in close proximity with a pre-set value. In other words, after setting a desired value of the temperature of the bath, for example around 1500-1600° C., the temperature is periodically detected as the melting cycle proceeds and the following cases may occur:
  if a lowering of the temperature with respect to the desired value is detected, this means that the scrap loading speed is too high and must therefore be slowed down, whereas
  if a temperature above the desired value is detected, this means that the loading is taking place too slowly and must therefore be speeded up.

The transport and pre-heating tunnel 11 serves to take the temperature of the metal charge to an average value around 200-270° C. before it is introduced into the electric furnace 12.

The tunnel 11 consists, in this case, of a plurality of modules 22 of which the first two, facing towards the electric furnace 12, are equipped with burners 19 in order to achieve the desired auto-combustion of the gases rising with respect to the advancing material.

At least some of the modules 22 are also equipped with air injectors 20, to achieve a post-combustion of the CO and other combustible gases contained in the exhaust gases.

In the initial part of the tunnel 11, in a position adjacent to the pre-heated fume-outlet pipe 24, there is a compensation chamber 23 which acts as a dynamic seal for the exhaust fumes to be introduced into the environment.

The purpose of the chamber 23 is to control the quantity of external air that can be sucked into the fume circuit from the loading side of the scrap conveyor.

The chamber 23 has ventilation means inside it, the function of which is to ensure that the depression inside the chamber 23 is slightly lower than the depression in the pipe 24. This stratagem allows to keep the quantity of air entering from the outside into the fume-outlet pipe at a reduced value, at the same time preventing the outlet of the fumes themselves into the atmosphere. Upstream of the fume-outlet pipe 24 there are also probes 25 to analyze the fumes and temperature sensors 26.

Before being discharged into the atmosphere, the fumes are also sent to a cooling tower 27.

The heating temperature inside the tunnel 11 is continually monitored by thermocouples 21.

According to the invention, a typical cycle time between two consecutive tapping operations is about 40-45 minutes.

A cycle starts with the unloading of the scrap into the furnace, in the bottom of which a quantity of metal is present comprising between 30% and 40% of its overall capacity, for example about 25 tonnes in the case of a capacity of about 80 tonnes.

In the initial step, various additives are introduced into the bath by means of lances and/or tuyères in order to carburize the bath and encourage a rapid foaming of the slag. If the slag foams as quickly as possible, it provides protection to the cooling panels from the radiations of the electric arc and allows to contain in the bath a good part of the heat; this allows to rapidly increase the speed of loading the scrap and also the progressive increase of the electric power.

This electric power is progressively increased as the quantity of scrap discharged inside the furnace increases, up to a maximum working value. The value delivered can grow from the initial value, equal to about 40-50% of the working value, to its maximum value.

Throughout the loading cycle, the weight of the furnace system and the temperature of the bath are monitored periodically, or also continuously, in order to regulate the unloading of the scrap so as to keep the temperature of the bath substantially constant.

When the desired quantity of scrap has been reached, unloading is interrupted, and the temperature of the bath is made to increase until the desired value for tapping is reached. According to the invention, at least the unloading of the scrap is interrupted before tapping for an interval of between about 8 and 12% of the overall time of the cycle.

The electric feed is also interrupted before tapping for a time of up to 5% of the total time of the cycle.

When the scrap is completely melted, and after the refining stage has also been completed, tapping is carried out, driving the jacks 17 so as to incline the hearth 13 and to discharge the molten metal into suitable containers or ladles.

Modifications or variants may be made to the method and device as described heretofore, all of which shall come within the field of the present invention, as defined by the attached claims.

The invention claimed is:

1. Method for pre-heating, transforming and melting a metal charge comprising metal scrap, in an electric arc furnace associated with a tunnel that transports, pre-heats and discharges said scrap, the furnace comprising a hearth and a roof through which the electrodes pass, comprising the steps of:
   weighing the furnace at least periodically to detect the quantity of discharged scrap from the tunnel delivered to and present inside the furnace itself;
   detecting the temperature of the liquid bath inside the furnace at least periodically, and
   at least the discharge delivery of the scrap from the tunnel to inside the furnace is detected by said weighing and is regulated to maintain said temperature of the liquid bath around a pre-determined value.

2. Method as in claim 1, wherein electric power delivered to the furnace is varied continuously from a minimum value in correspondence with a first unloading step of the scrap to a maximum value in correspondence with a melting step according to the quantity of scrap present inside the furnace as detected by weighing the furnace.

3. Method as in claim 2, wherein said minimum value of electric power delivered is made to increase from an initial value of about 40-50% of the working value, to its maximum value.

4. Method as in claim 2, wherein a quantity of liquid metal of around 30-40% of the overall capacity is always left in the furnace to constitute a liquid reserve for the subsequent cycle.

5. Method as in claim 2, wherein in the tapping step the electrodes are at least raised from the liquid bath and electric feed to them is interrupted.

6. Method as in claim 2, wherein between the end of a tapping operation and the start of loading the scrap for the subsequent cycle, electric feed to the electrodes is interrupted and the following operations are carried out:
   a) the furnace is rotated from a tapping position to a slagging position to interrupt the flow of liquid steel;
   b) cleaning of a tapping hole is controlled;
   c) a tapping channel is filled with granular material with a high melting point;
   d) the furnace is returned to a horizontal position and abutments are inserted that limit the rotation to reduced values during normal functioning;
   e) the electrodes are enabled to descend and delivery of electric power is restored.

7. Method as in claim 1, wherein loading of the furnace with the scrap is interrupted before tapping of liquid metal from the liquid bath for an interval of between about 8 and 12% of the overall time of the cycle.

8. Method as in claim 7, wherein the feed of electric power to the furnace is interrupted before tapping for a time of up to 5% of the overall time of the cycle.

9. Method as in claim 1, wherein the feed of electric power to the furnace is interrupted before tapping for a time of up to 5% of the overall time of the cycle.

10. Method as in claim 1, said regulating comprising slowing the speed of scrap discharging into the furnace if a lowering of the temperature with respect to the pre-determined value is detected and increasing the speed of scrap discharging into the furnace if a raising of the temperature with respect to the pre-determined value is detected.

11. Method as in claim 1, wherein
    said electric furnace comprises a hearth to contain the scrap and a covering roof through which electrodes pass, supported and moved by relative arms,
    weighing means weighs said electric furnace,
    detecting means detects the temperature of a bath of liquid metal inside said furnace, and
    regulating means regulates the speed of unloading the scrap inside said furnace according to detections made by said weighing means to keep the temperature of said bath of liquid metal around the pre-determined value.

12. Method as in claim 11, wherein said weighing means comprise load cells.

13. Method as in claim 11, wherein said hearth is mounted on jacks able to make the hearth oscillate for a limited angle, comprised between ±4°, during normal functioning, for example during the steps of loading, melting and refining the liquid metal, and for a greater angle, comprised between −15° and ±25°, during the steps of discharging the slag and tapping the liquid metal.

14. Method as in claim 11, wherein said hearth has a shape, in relation to the inclination that the hearth assumes in a step of tapping the liquid metal, to keep a liquid pool equal to about 30-40% of its capacity.

15. Method as in claim 11, wherein said transport and pre-heating tunnel comprises a plurality of injection systems, wherein at least the injection system nearest the electric furnace has at least a burner and wherein at least in a position adjacent to said burner there is at least an air injector.

16. Method as in claim 11, wherein in the initial part of said tunnel, in a position adjacent to a pre-heated fume-outlet pipe, there is a compensation chamber able to function as a sealing system to prevent exhaust fumes emerging from the tunnel from leaking into the atmosphere.

17. Method as in claim 11, wherein in cooperation with said transport and pre-heating tunnel there is a sedimentation chamber to deposit the particulate, and the sedimentation chamber is associated with a cooling tower to take the temperature of fumes, entering at about 20 m/s, to about 250° C. or less.

18. Method as in claim 17, wherein the fumes enter into the sedimentation chamber at about 800° C.

19. Method as in claim 17, wherein the fumes are cooled in the cooling tower at a cooling speed of not less than 250° C./sec.

20. Method as in claim 17, wherein the fumes are cooled in the cooling tower at a cooling speed of not less than 400° C./sec.

* * * * *